(No Model.)

C. B. SLATER.
CONVEYER FOR FLOUR BOLTS, &c.

No. 277,622. Patented May 15, 1883.

Attest:
D. S. Oliver
Alex. M. Young

Inventor:
Charles B. Slater
By Geo. Murray
Attorney

UNITED STATES PATENT OFFICE.

CHARLES B. SLATER, OF BLANCHESTER, OHIO.

CONVEYER FOR FLOUR-BOLTS, &c.

SPECIFICATION forming part of Letters Patent No. 277,622, dated May 15, 1883.

Application filed December 8, 1882. (No model.)

*To all whom it may concern:*

Be it known that I, CHARLES B. SLATER, a citizen of the United States, residing at Blanchester, in the county of Clinton, State of Ohio, have invented certain new and useful Improvements in Conveyers for Flour-Bolts, Middlings-Purifiers, Centrifugal Reels, and Similar Mechanisms, of which the following is a specification.

The object of my invention is a means to effect a perfect separation of the products as they fall from the reel and convey them to one or other of the conveyers arranged below the reel-case. This I accomplish by the means illustrated in the accompanying drawings, in which—

Figure 1:
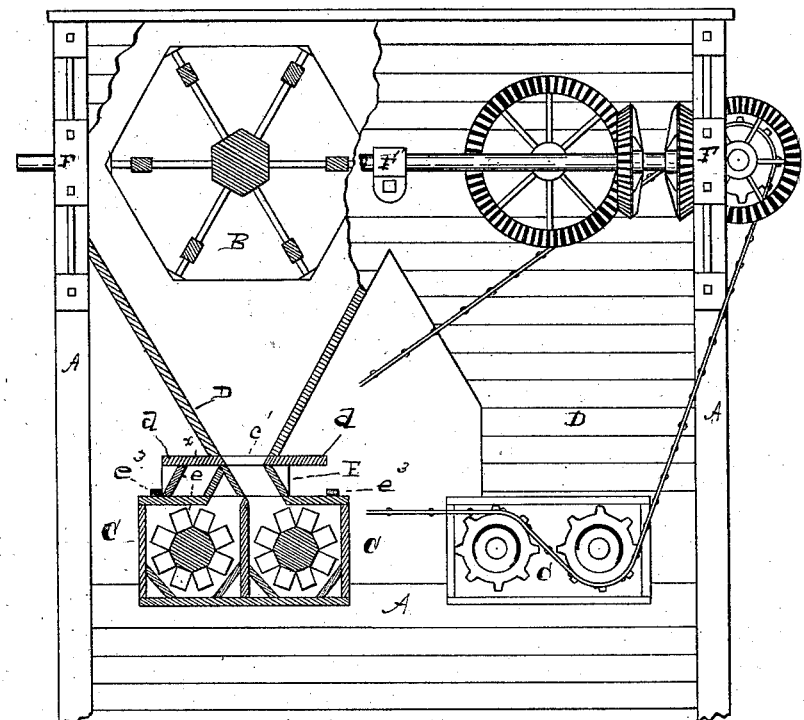
Figure 2:
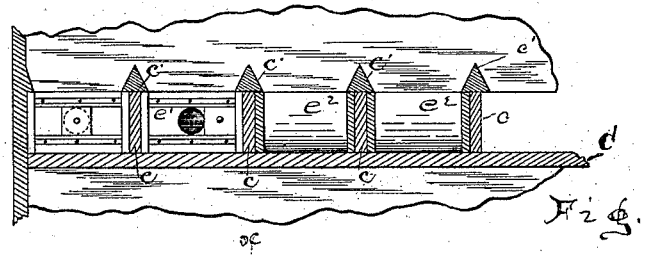
Figure 3:
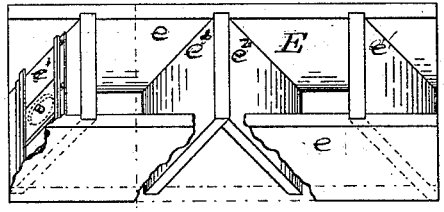

Figure 1 is a view, partly in elevation and partly in vertical section, of a bolting-chest embodying my improvements. Fig. 2 is a longitudinal vertical section of the mechanism between the reel and conveyer-cases for conveying the material from the reel-case to either of the conveyer-cases, as desired. This view represents the devices as drawn to a scale about double that of Fig. 1. Fig. 3 is an enlarged perspective view of one of the sliding chutes for conveying the material from the reel-hopper to the conveyers.

Throughout the various views like parts are represented by similar reference-letters.

To illustrate my invention I have selected an ordinary bolt-chest, of which Fig. 1 represents the upper portion.

A represents the framing-timbers; B, the reel, mounted and cased in the usual way. The double conveyer-cases C are mounted upon the cross-pieces of the frame, into which they are recessed, as shown, to retain them firmly in place. The hopper D is supported upon cross-partitions $c$, which rest upon the conveyer-cases C. These partitions, of which there may be any desired number, are placed across the top of the conveyer-case at uniform distances apart, so as to form ways for the sliding cut-off device E, Fig. 3. This device consists of two side pieces, $e$, which are diagonally grooved upon their adjacent faces to receive the cross-partitions $e'\ e^2$, which form, with the side pieces, two inclined chutes leading in opposite directions. When the cut-off is moved against its stop $e^3$ in either direction, one of the inclined chutes will register with the lower opening in the hopper D. When pushed to the left, as shown in Fig. 1, the chute upon the right side of the slide registers truly with the bottom of the hopper and the opening to the conveyer upon the right-hand side, and when the sliding cut-off is pushed against the stop upon the opposite side the left chute will connect the hopper with the left conveyer.

Upon the tops of the cross-partitions $c$, and projecting into the lower part of the hopper, are beveled cross-pieces $c'$, which overlap the top edges of the slide sides $e$. These are for the purpose of guiding the materials to the proper chutes. In the outer end piece, $e'$, of the sliding chute is a hand opening or hole, which is closed by a sliding door. Through this opening the material passing from the reel to the conveyer may be inspected to determine whether it is fit for one or for the other of the conveyers.

The conveyer-case is divided into two compartments by a central longitudinal partition which extends up to a level with the top of the conveyer-case. Upon top of this partition one or the other of the central cross-partitions, $e^2$, rests, in whichever direction the sliding chutes are pushed, so that the two compartments are completely separated from each other, and none of the materials intended for one conveyer can pass or be impelled into the other by the conveyer-flights. By this means a perfect cut-off is secured between the conveyers. Two boards, $d$, extend from the sides of the hopper D over the tops of the slides E, to protect the chute which is not in use from dust, which would otherwise settle in it and be carried into the conveyer when the slide is changed to lead the material into the opposite conveyer.

I have shown my sliding cut-off device adapted to use with conveyers arranged side by side and immediately under the hopper of the bolting-reel; but it is evident that the chutes may be arranged to register with spouts leading to conveyers placed in any position.

I have shown my mechanism for separating the materials applied to my patent rotary bolting-reel. It is, however, apparent that the cut-off device may be readily applied to any screening mechanism.

In Fig. 1 the reels are represented as being driven by bevel-gear secured upon a horizontal shaft which has its bearings in brackets F, secured to the upright corner timbers and centrally supported by a bracket, F', secured to one of the cross-braces; and the conveyers are represented as being driven by an endless chain which passes over a sprocket-wheel upon the driving-shaft and alternately under and over sprockets upon the projecting ends of the conveyer-shafts, instead of the vertical shafts and miter-gear generally used; but it is not necessary to specifically describe this mechanism and its advantages here, as I intend to make this arrangement the subject of a separate application.

The material to be bolted, whether flour, middlings, bran, or other product of ground or crushed grain or other material, is fed to the reel or other bolting device in the usual manner. In feeding the material there is a current of air produced which blows the dust through the reel at this end. It is therefore best to set two or three of the chutes to convey the material from this part of the chest to the return-conveyer, thus performing the office of the speck-box and obviating the necessity of using such device. From this point the material passing from the reel is comparatively better for a distance varying from two to ten feet, while the material as it approaches the tail of the reel becomes gradually poorer, so that usually from two to ten of the sliding chutes are set to convey the material into the flour-conveyer, while the remaining ones, toward the tail of the bolt, are set to carry into the return-conveyer. The number of chutes set to carry into each conveyer can be readily determined by inspection through the hand-opening in the end of the slide, and will depend, of course, upon the quality of the material undergoing the process of bolting.

It is plain that the conveyers may be arranged to discharge at either end of the bolting-chest, and it is often convenient to discharge the flour at one end while the product from the return-conveyer is discharged at the other end.

In Fig. 2 the section is taken through dotted line $x\,x$, Fig. 3, and in the section view the two end boxes are pushed in to carry into the inside conveyer. The ends of these boxes are therefore seen in elevation, while the two boxes to the right are cut upon the section-line indicated.

The chutes are ordinarily made about eight or ten inches wide, and are arranged under the entire length of the machine, so that the material may be separated at any point in the length of the bolting reel or sieve.

What I claim, and desire to secure by Letters Patent, is—

1. In a bolting-machine, a cut-off, E, consisting, substantially as before set forth, of the side pieces, $e$, the partitions $e^2$, joined at the top and diverging from top to bottom, and the end partitions, $e'$, each arranged parallel to the adjacent partition $e^2$.

2. In a bolting-machine, a cut-off, E, consisting, substantially as before set forth, of the side pieces, $e$, the partitions $e^2$, joined at the top and diverging from top to bottom, the end partitions, $e'$, arranged as described, one of which is provided with a hand-hole, and a door or slide for closing said hand-hole.

3. In a bolting-machine, the combination, with the hopper D and the double conveyers C, of the sliding cut-off E, having two independent closed chutes diverging from top to bottom, said cut-off being adapted to form a conduit between the discharge end of the hopper and either one of the conveyers, substantially as described.

4. In a bolting mechanism, the combination, with the bolting-case and a conveyer-case arranged below the same, of a two-chute cut-off device having a hand-hole arranged in one of its ends, and provided with a door or slide for closing said hand-hole, substantially as shown, and for the purpose specified.

CHARLES B. SLATER.

Witnesses:
CHAS. KUHL,
GEO. J. MURRAY.